United States Patent
Kientz et al.

(10) Patent No.: US 6,934,115 B1
(45) Date of Patent: Aug. 23, 2005

(54) BAND IDENTIFICATION USING A SINGLE C-CORE SERVO WRITE HEAD FOR TIMING BASED SERVO PATTERNS

(75) Inventors: Steven Michael Kientz, Westminster, CO (US); David Lyle Peterson, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 459 days.

(21) Appl. No.: 10/132,611

(22) Filed: Apr. 25, 2002

(51) Int. Cl.[7] .................. G11B 5/584; G11B 21/02; G11B 5/29
(52) U.S. Cl. .................. 360/77.12; 360/75; 360/121
(58) Field of Search .................. 360/119, 121, 122, 360/125, 75, 77.01, 77.12, 78.02, 72.1, 72.2, 360/48

(56) References Cited

U.S. PATENT DOCUMENTS

| | | | |
|---|---|---|---|
| 5,689,384 A | 11/1997 | Albrecht et al. | 360/77.12 |
| 6,021,013 A | 2/2000 | Albrecht et al. | 360/53 |
| 6,091,565 A * | 7/2000 | Schwarz et al. | 360/75 |
| 6,169,640 B1 | 1/2001 | Fasen | 360/48 |
| 6,236,525 B1 * | 5/2001 | Cates et al. | 360/51 |
| 6,700,729 B1 * | 3/2004 | Beck et al. | 360/76 |
| 6,744,594 B2 * | 6/2004 | Denison et al. | 360/121 |

* cited by examiner

Primary Examiner—Andrew L. Sniezek
(74) Attorney, Agent, or Firm—Yee & Associates P.C.

(57) ABSTRACT

A timing based servo alignment system that uses a set of band identification marks to determine which data band is being currently read. The system uses a read module having a plurality of band identification read elements. The band identification read elements are placed on the read module such that each band identification read element is aligned only to the band identification marks when a corresponding data band is aligned to the data read element.

18 Claims, 2 Drawing Sheets

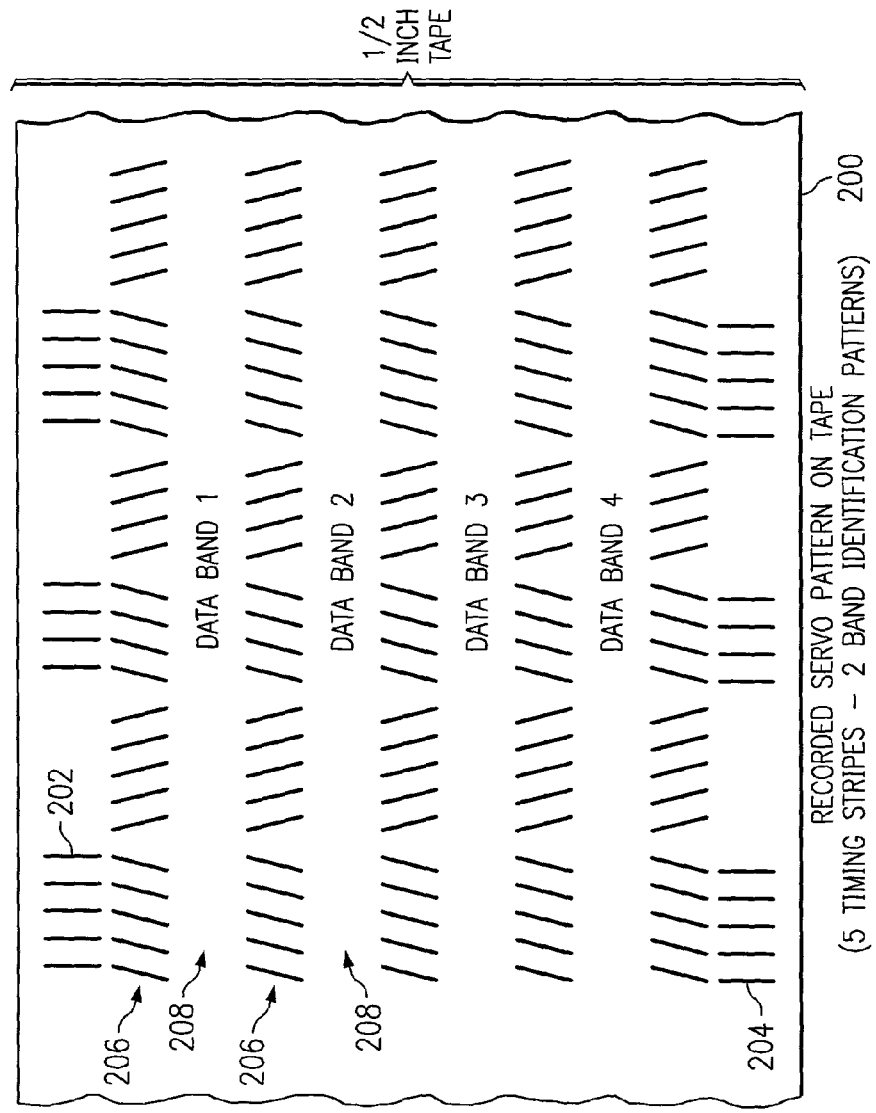
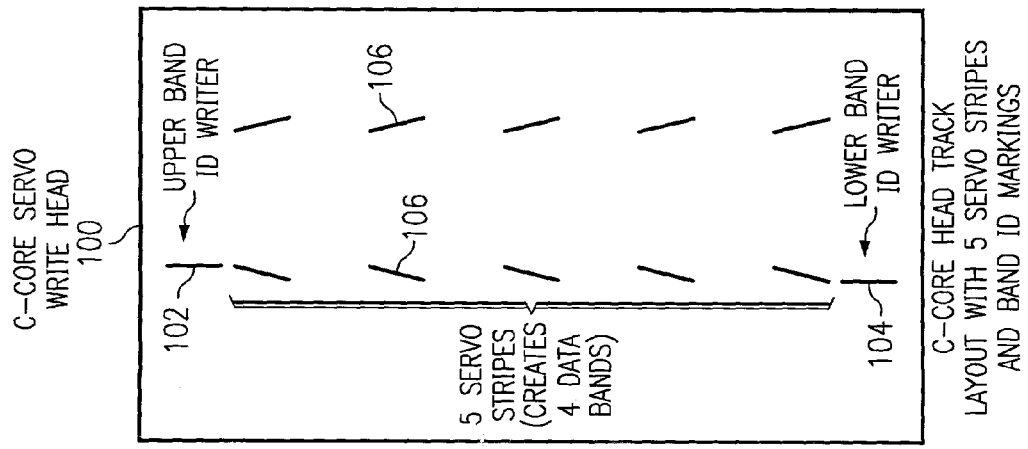

BAND IDENTIFICATION USING A SINGLE C-CORE SERVO WRITE HEAD FOR TIMING BASED SERVO PATTERNS

BACKGROUND OF THE INVENTION

1. Field of the Invention

The present invention relates generally to magnetic recording media, and more particularly to data band identification in timing based servo systems.

2. Background of the Invention

Current magnetic storage devices include multiple data tracks or bands on a single storage medium as a means of increasing storage density. Increasing the number of data bands on a tape (or other storage medium) requires a means of aligning a read write head with the proper data band. Failure to properly align a read write head can result in failure to access the correct data, or loss of data due to improper overwriting.

To achieve accurate alignment of read write heads to storage media, servo bands are prewritten on the medium. servo bands allow a read write head to determine the exact lateral position of the head relative to the medium. The position is determined by comparing the amplitude or phase responses of the signals generated from the respective servo tracks.

Timing based servo tracking often uses servo tracks with sloped magnetic transitions. The timing between two marks indicates the alignment of the read module.

Timing based servo patterns are an efficient means of determining fine alignment within a data band. However, locating and verifying which data band is read at a given time requires either modification of the servo patterns, which may not be a viable option. If all the servo patterns are identical, then additional information is required for differentiation of the data bands. Therefore, the art would benefit from a means of identifying data bands in such systems.

SUMMARY OF THE INVENTION

The system and method described herein enables data band identification while using identically patterned servo tracks. In a preferred embodiment, the innovative system includes a C-core type servo write head having etched half chevron patterns for timing based servo tracks and additional etched vertical marks for band identification. The band identification marks are vertical lines at the top and bottom of the servo write head, called upper and lower band ID marks. A write driver is used with the write head to record the pattern on a tape or other suitable medium.

Once recorded and wound into a data cartridge (for example), the band identification can take place with a read module in the drive. The read module preferably includes servo read elements to read the servo marks, band ID elements to read the band ID marks, and data read elements to read data.

When the read head is in a first position, a first band ID read element is aligned with the band ID marks near one edge of the tape. When the first band ID read element is thus aligned, servo read elements are aligned to the servo tracks around a first data band. Hence, when the first band ID element receives information consistent with the and ID marks, the data band being read is known.

When the read head is in a second position, a second band ID read element is aligned with the band ID marks. When this second band ID element is thus aligned, the servo read elements are aligned with servo tracks around a second data band. Hence, when the second band ID element receives data consistent with the band ID marks, the read element is known to be reading the second band of data. Data band identification is thereby achieved, requiring only one servo write head for the servo and band identification marks.

In a preferred embodiment, the read head is moved laterally relative to the tape by a head actuator, allowing placement of any given band ID element on the read head over the band ID marks on the medium. Band ID elements that are not positioned over the band ID marks and which therefore receive data that does not correlate to anticipated band ID data are ignored. There are preferably as many band ID read elements as there are data bands.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 shows a servo write head consistent with a preferred embodiment.

FIG. 2 shows a recorded servo pattern on a tape, consistent with a preferred embodiment.

DETAILED DESCRIPTION OF THE PREFERRED EMBODIMENT

Figure 3:
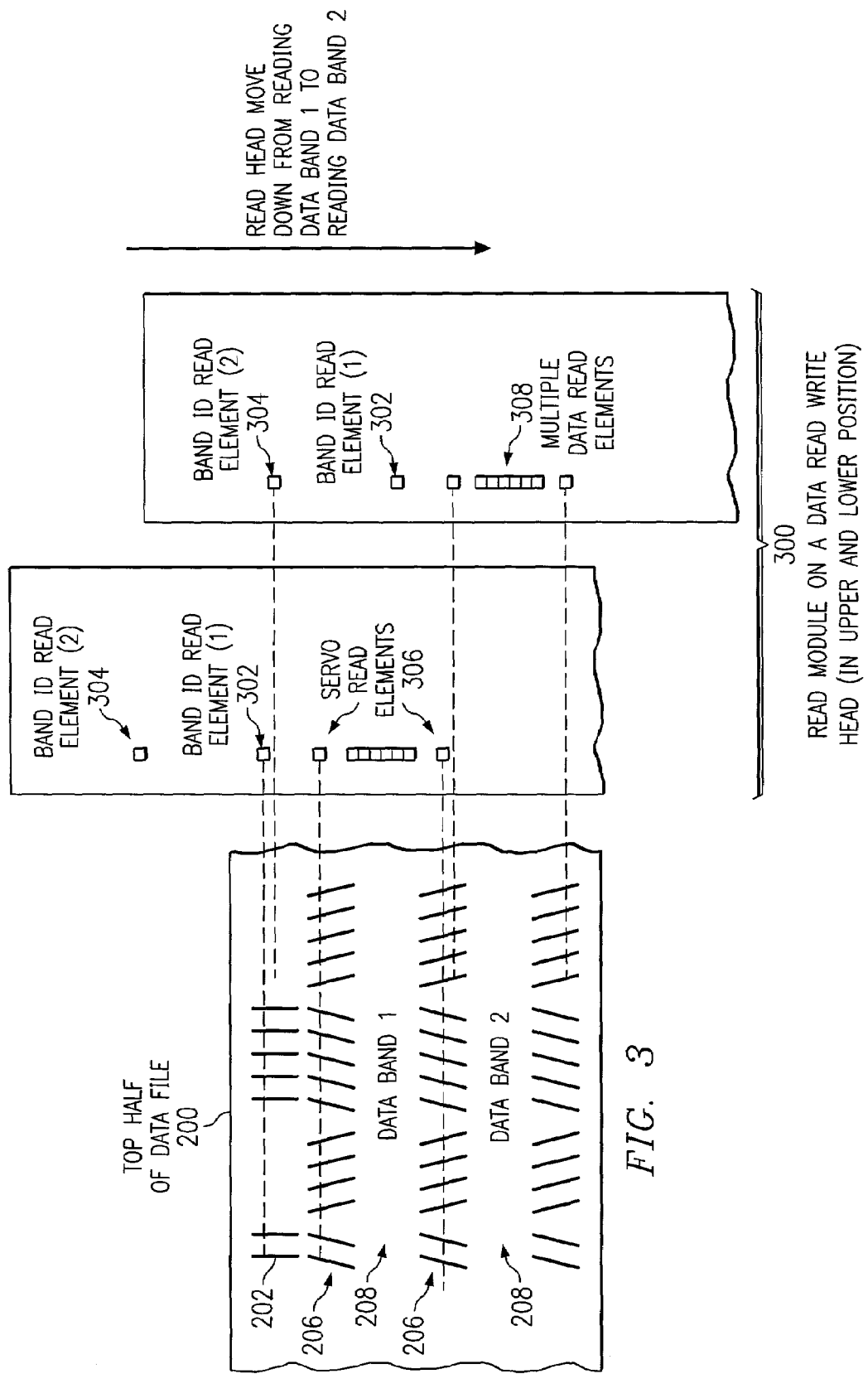
FIG. 3 shows the positioning of a read module during practice of the present innovations.

Following is an example implementation of the innovations of the present application. The example is described with reference to the figures. Though specific materials, numbers, and other aspects are given, these only serve as examples for teaching the present innovations and are not intended to limit the invention, which is described by the claims.

FIG. 1 shows a c-core servo write head consistent with a preferred embodiment of the present innovations. Such a write head is described as it can be used to format magnetic storage media with the necessary servo marks and band identification marks for the practice of the present innovations.

The c-core head structure uses a large magnetic core structure which enables complex patterns to be etched into the surface of the write head. When a current is applied the patterns are all recorded simultaneously. This method is typically used, for example, to generate angled timing based servo patterns.

The innovative write head 100 shows upper band ID writer 102 and lower band ID writer 104. These are shown at the top and bottom of the write head, respectively. The band ID writers make marks on a storage medium so that when the medium is read, the marks provide a reference for band ID read elements (see FIG. 3) which are located on the read write head. When a given band ID element receives information consistent with the band ID marks, the data band being read by the read write head is known. This innovation is described further below.

Note that FIG. 1 shows band ID writers at both the top and bottom of the write head. This is not necessarily the only way to implement the present innovations. Particularly, the present innovations include embodiments where only one band ID writer is necessary. This is described further below.

FIG. 1 also includes five sets of servo write elements 106, which create the servo marks on the storage medium. The servo marks are used to maintain alignment of the read head to the storage medium.

FIG. 2 shows a magnetic storage medium which has the recorded servo pattern according to a preferred embodiment. This figures shows a section of a magnetic tape 200. At the top of the figure, upper band ID marks 202 are shown. Lower band ID marks 204 are also shown at the bottom of the tape 200. The band ID marks are preferably perpendicular to the direction of motion of the tape. Servo tracks 206 are also shown. In this example, there are five sets of servo tracks 206 which form four data bands 208. Of course it should be noted that more or less data bands are possible by adding or removing servo tracks or by considering a data band to be governed by a group of three servo bands rather than just one or two. Likewise, only one band ID track is necessary in some implementations, described below.

FIG. 3 shows a top portion of the magnetic tape 200 with servo tracks 206 and band ID marks 202, and a top portion of a read module 300 from a read write head. In this figure, the read module 300 is shown in two different positions, an upper position (where the read module 300 is aligned to read data band 1) and a lower position (where the read module 300 is aligned to read data band 2). Also shown on the read module are first band ID read elements 302, second band ID read elements 304, servo read elements 306, and data read elements 308.

When in the first position (upper module in the figure), the read module 300 is aligned so that band ID read element 302 is aligned with the band ID marks 202 on the magnetic tape. In such an alignment, only band ID read element 302 receives the known band ID mark data from the storage tape 200. This allows for band identification while data band 1 is read. Band ID read element 304 receives no data or data inconsistent with the ID mark data, and is ignored.

When band ID read element 304 receives band ID mark data by reading band ID marks 202, the read module 300 is in a known position, i.e., data read element 306 is aligned to read data from data band 1 208. Meanwhile, servo read elements 306 are positioned over the servo tracks 206 on either side of data band one 208.

To switch data bands 208 being read, the entire head structure 300 is moved down (in this example) using a head actuator (not shown) until it is aligned with the desired data band 208 (for example, data band 2). This places the head structure in a position allowing band ID read element 304 to read the band ID marks 202 on tape 200. At this time, band ID read element 302 is reading data from another region which does not contain the data of band ID marks 202. Since this data does not correlate with the anticipated band ID signal, the data, and read element 302, are ignored.

Hence, when a first band ID read element 302 receives a band ID signal, data band 1 is read by the data read element 308. when a second band ID read element 304 receives a band ID signal, data band 2 is read by the data read element 308.

This system can of course be extended to a large number of data bands by adding corresponding band ID read elements to the top of the read module 300.

Though the above examples describe a single data band identification track on the storage medium, the present innovations can also be implemented with more data band identification tracks on the storage medium. This variation of the present ideas allows for different reading options of the storage medium as well. For example, if the servo write head has two band ID writers, one at the top edge of a tape (for example) and one at the bottom, the resulting tape would have a band identification track above and below the outermost servo stripes, respectively. This would allow a read module to have band ID read elements on both ends, positioned on the read module so that only one band ID read element is ever properly aligned with a band identification track at a time. Alternatively, two read modules could be used, each with only one band identification read element. In this case, the two read modules would preferably be oriented so that one has its band ID read element at the "top" of the tape, the other at the "bottom" of the tape, so that only one read module would be aligned at any given time. By combining the concepts of multiple data band identification tracks on the storage medium and multiple band ID read elements or multiple read modules, it can be seen that a wide array of implementations of the present innovations are possible.

It should also be noted that the band ID marks need not be only at the top or edge of a storage medium, but can also be interspersed between data bands, for example.

Of course, the above examples referring to a magnetic tape as the storage medium are not intended to limit the application of these ideas to tapes only. The present innovations are also capable of being implemented on disk storage or other storage methods or media.

Though the preferred embodiments have been described distinguishing between the data read elements and the band identification elements, a configuration where some read elements serve both as band ID elements and data read elements is consistent with the present innovations. In such a case, a read element would serve as both a band identification read element, and as a data read element, depending on its position relative to the tape.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A servo write head, comprising:
   a plurality of servo stripes for making servo patterns on a storage medium;
   a writer for making identification marks on the storage medium;
   wherein when the identification marks are read by a first identification read element, a data read element is aligned to read a first data band; and
   wherein when the identification marks are read by a second identification read element, the data read element is aligned to read a second data band.

2. The write head of claim 1, wherein the first and second identification read elements and the data read element are on the same read head.

3. The write head of claim 1, wherein the data read element is aligned by lateral movement relative to the storage medium, the lateral movement caused by a head actuator.

4. A data storage system, comprising:
   a storage medium having servo patterns thereon, the servo patterns substantially describing a plurality of bands;
   band identification marks on the storage medium;
   a read head having a plurality of band identification read elements; and
a plurality of servo read elements; and
a data read element;
wherein the data band being read by the data read element is determined by which band identification read element of the plurality of band identification read elements reads the band identification marks.

5. The system of claim 4, wherein the servo patterns and the band identification marks are placed on the storage medium by a c-core servo write head.

6. The system of claim 4, wherein the storage medium is aligned to the read head by reading the servo patterns.

7. The system of claim 4, wherein the read head is moved into alignment by a head actuator.

8. The system of claim 4, wherein the band identification marks and the servo patterns are placed on the storage medium by a single c-core type write head.

9. The system of claim 4, wherein the data read element is one of the plurality of the band identification read elements.

10. A method of aligning a read write module, comprising the steps of:
   placing identification marks on a storage medium;
   reading at least part of the storage medium with a read module having a plurality of identification read elements;
   when a first identification read element of the plurality receives a signal consistent with the identification marks, reading a first band;
   when a second identification read element of the plurality receives a signal consistent with the identification marks, reading a second band.

11. The method of claim 10, wherein the first band is read by a read element on the read module in a first alignment relative to the storage medium, and the second band is read by the read element in a second alignment relative to the storage medium.

12. The method of claim 11, wherein the read module is moved from the first alignment to the second alignment relative to the storage medium by a head actuator.

13. The method of claim 10, wherein the storage medium has timing based servo patterns thereon.

14. The method of claim 10, wherein in the step of reading a first band, the first band is read by one of the plurality of the identification read elements.

15. The method of claim 10, wherein in the step of reading a first band, the first band is read by a data read element.

16. A method of identifying data bands on a storage medium, comprising the steps of:
   detecting magnetic marks on a storage medium with a first band identification read element,
   reading a first band on the storage medium with a read element other than the first band identification read element,
   detecting magnetic marks on the storage medium with a second band identification read element, and
   reading a second band on the storage medium with a read element other than the second band identification read element.

17. The method of claim 16, wherein the first band and the second band are read by the same read element, and wherein the read element is moved relative to the storage medium by a head actuator.

18. The method of claim 16, wherein the first and second band identification read elements are on the same read head, and wherein alignment is maintained between the storage medium and the read head by tracking timing based servo patterns on the storage medium.

* * * * *